United States Patent
Sandegård et al.

(10) Patent No.: US 7,702,282 B2
(45) Date of Patent: Apr. 20, 2010

(54) CONVEYING COMMANDS TO A MOBILE TERMINAL THROUGH BODY ACTIONS

(75) Inventors: Anette Sandegård, Malmoe (SE); Kristoffer Åberg, Lund (SE); Erik Ahlgren, Malmö (SE); Robert Simon Lessing, Malmö (SE)

(73) Assignee: Sony Ericsoon Mobile Communications AB, Lund (SE)

( * ) Notice: Subject to any disclaimer, the term of this patent is extended or adjusted under 35 U.S.C. 154(b) by 505 days.

(21) Appl. No.: 11/622,650

(22) Filed: Jan. 12, 2007

(65) Prior Publication Data

US 2008/0014989 A1 Jan. 17, 2008

Related U.S. Application Data

(60) Provisional application No. 60/807,284, filed on Jul. 13, 2006.

(51) Int. Cl.
*H04B 7/00* (2006.01)
*H04B 5/00* (2006.01)
*H04B 1/034* (2006.01)
*H04M 11/04* (2006.01)
*H04M 1/00* (2006.01)
*H04W 24/00* (2009.01)

(52) U.S. Cl. ............... 455/41.2; 455/41.1; 455/100; 455/404.2; 455/423; 455/456.1; 455/557

(58) Field of Classification Search ............ 455/41.2, 455/456.1, 517, 412, 575, 419, 420, 410, 455/411, 41.1, 100, 423, 404.2, 557, 564; 340/540
See application file for complete search history.

(56) References Cited

U.S. PATENT DOCUMENTS

| | | | | |
|---|---|---|---|---|
| 6,549,792 | B1* | 4/2003 | Cannon et al. | 455/550.1 |
| 7,145,454 | B2* | 12/2006 | Linjama et al. | 340/540 |
| 7,181,192 | B2* | 2/2007 | Panasik et al. | 455/404.1 |
| 7,274,909 | B2* | 9/2007 | Perttila et al. | 455/41.2 |
| 7,430,439 | B2* | 9/2008 | Griffin et al. | 455/552.1 |
| 2004/0002305 | A1* | 1/2004 | Byman-Kivivuori et al. | 455/41.2 |
| 2004/0117651 | A1 | 6/2004 | Little et al. | |

(Continued)

FOREIGN PATENT DOCUMENTS

DE 102004008254 9/2005

(Continued)

OTHER PUBLICATIONS

Steven Strachan et al., "Dynamic Primitives for Gestural Interaction", 2004, 5 pages.

(Continued)

*Primary Examiner*—Lun-Yi Lao
*Assistant Examiner*—Mong-Thuy Tran
(74) *Attorney, Agent, or Firm*—Harrity & Harrity, LLP (57) ABSTRACT

Interactions with a trigger device and/or body motions, such as motions detected with an accelerometer, may be used to augment user input interaction with a mobile terminal. In one implementation, logic senses when a first trigger device enters close proximity to the mobile terminal. A command for the mobile terminal is then executed based on the trigger device. The trigger device may be, for example, integrated with jewelry or clothing.

19 Claims, 8 Drawing Sheets

U.S. PATENT DOCUMENTS

| | | | |
|---|---|---|---|
| 2004/0157648 A1* | 8/2004 | Lightman | 455/566 |
| 2005/0184870 A1* | 8/2005 | Galperin et al. | 340/568.2 |
| 2005/0272408 A1* | 12/2005 | Wilkes-Gibbs et al. | 455/412.2 |
| 2006/0044153 A1* | 3/2006 | Dawidowsky | 340/825.22 |
| 2009/0093272 A1* | 4/2009 | Saarisalo et al. | 455/558 |

FOREIGN PATENT DOCUMENTS

| | | |
|---|---|---|
| EP | 1376457 A1 | 1/2004 |
| GB | 2384942 | 8/2003 |
| WO | WO2004/003801 | 1/2004 |
| WO | WO 2004/003801 | 1/2004 |

OTHER PUBLICATIONS

Jussi Ängeslevä et al., "Body Mnemonics: Portable Device Interaction Design Concept", Media Lab Europe, Dublin, Ireland, 2003, 3 pages.

Jussi Ängeslevä et al., "Body Mnemonics", Media Lab Europe, Dublin, Ireland, Sep. 2006, 3 pages.

Annex to Form PCT/ISA/206, "Invitation to Pay Additional Fees with Annex entitled, Communication Relating to the Results of the Partial International Search" for related PCT Application No. PCT/IB2007/050476, mailed Jul. 9, 2007 (7 pages).

Walko, J., "A Ticket to Ride," Communications Engineer, IET Publishing Group, Stevenage, GN, vol. 3, No. 1, XP-001229858, Feb. 2005 (4 pages).

International Preliminary Report on Patentability issued for corresponding international application No. PCT/IB2007/050476 dated Oct. 17, 2008, 11 pages.

PCT International Search Report with Written Opinion for corresponding PCT Application No. PCT/IB2007/050476, mailed Nov. 12, 2007, 23 pages.

Walko, J: "A Ticket to Ride" Communications Engineer, IET Publishing Group, Stevenage, GB, vol. 3, No. 1, Feb. 2005, pp. 11-14, XP001229858.

* cited by examiner

CONVEYING COMMANDS TO A MOBILE TERMINAL THROUGH BODY ACTIONS

RELATED APPLICATION

This application claims priority under 35 U.S.C. §119 based on U.S. Provisional Application Ser. No. 60/807,284, filed Jul. 13, 2006, the disclosure of which is incorporated herein by reference.

TECHNICAL FIELD OF THE INVENTION

The invention relates generally to the operation of mobile communication devices and, more particularly, to controlling mobile communication devices.

DESCRIPTION OF RELATED ART

Mobile communication devices, such as cellular telephones, have become increasingly versatile. For example, mobile telephones often support features in addition to voice communication. Such features may be implemented as software applications or programs on the communication device that enable the user to, for example, play music and games, obtain directions or maps to a place of interest, obtain sports scores, obtain weather information, or access email. Such additional features have made mobile terminals increasingly important to users.

Because of their relatively small size, mobile communication devices tend to have limited input and output capabilities. For example, most mobile communication devices have a fairly small visual display and a limited number of keys through which a user may physically interact with the device. Given the increasing array of features included in mobile communication devices, this limited ability to interact with the mobile communication device can be increasingly troublesome.

SUMMARY

According to one aspect, a mobile terminal includes first logic to sense a first trigger device when the mobile terminal enters close proximity to the first trigger device. The mobile terminal also includes second logic to execute a command associated with the first trigger device when the first trigger device is sensed by the first logic, the command relating to operation of the mobile terminal.

The first logic may sense the first trigger device when the first trigger device comes within a distance of approximately three centimeters or less of the mobile terminal.

Additionally, the first logic to sense may sense the first trigger device using a passive mode of operation in which the first trigger device receives power from the mobile terminal.

Additionally, the command associated with the first trigger device may be a command to dial a predetermined number.

Additionally, the first logic may include logic to identify the first trigger device from among a number of possible different trigger devices.

Additionally, the first trigger device may be embedded in jewelry or clothing.

Additionally, the first trigger device may be a ring and the command associated with the first trigger device may be a security related command that disables or hides functionality of the mobile terminal when the mobile terminal is not within close proximity of the first trigger device.

Additionally, the first logic may be based on near field communication (NFC) protocol.

Additionally, the first logic may be based on radio frequency identification (REID) techniques.

Additionally, the mobile terminal may further comprise logic to sense whether the mobile terminal is moved in one of a number of predefined motions and logic to execute a second command associated with a sensed one of the predefined motions when the predefined motion is sensed.

Additionally, the logic to sense may include an accelerometer.

Another aspect is directed to a security system for securing an electronic device. The security system includes a wearable device; first logic to sense the ring when the electronic device is within close proximity of the ring; and second logic to execute security related functions of the electronic device when the electronic device is not sensed by the first logic.

Additionally, the electronic device may be a finger-wearable ring.

Additionally, the electronic device may be a wireless mobile communication terminal.

Additionally, the first logic may sense the wearable device when the wearable device comes within a distance of approximately three centimeters or less of the electronic device.

Additionally, the wearable device may include logic to receive power from the first logic and to use the power to transmit a signal to the first logic.

Additionally, the first logic may be based on the NFC protocol.

Additionally, the first logic may be based on RFID techniques.

Another aspect is directed to a method implemented in a mobile terminal. The method may includes sensing a presence of a first trigger device when the first trigger device comes within close proximity of the mobile terminal; recording an output of an accelerometer beginning when the presence of the first trigger device is sensed; analyzing the output of the accelerometer to determine if the output corresponds to a command that is associated with the mobile terminal; and performing an action at the mobile terminal pursuant to the command.

Additionally, the method may include ceasing recording the output of the accelerometer when a presence of a second trigger device is sensed.

Additionally, the trigger device may be embedded in jewelry or clothing.

Additionally, close proximity of the mobile terminal may be a distance of approximately three centimeters or less to the mobile terminal.

Additionally, the first trigger device may not include an internal power supply.

Additionally, the command associated with the trigger device may be a command to dial a predetermined number or answer a ringing of the mobile terminal.

Additionally, automatically sensing the trigger device includes identifying the first trigger device from among a number of possible different trigger devices.

Additionally, automatically sensing the trigger device is based on the NFC protocol.

Additionally, automatically sensing the trigger device is based on RFID techniques.

Yet another aspect is directed to a device comprising means for automatically sensing a presence of a trigger device when the trigger device comes within close proximity of the device; means for issuing a command that was previously associated with the trigger device by a user of the device; and means for performing an action at the device pursuant to the command.

Other features and advantages of the invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Exemplary Communication Device

Figure 1:
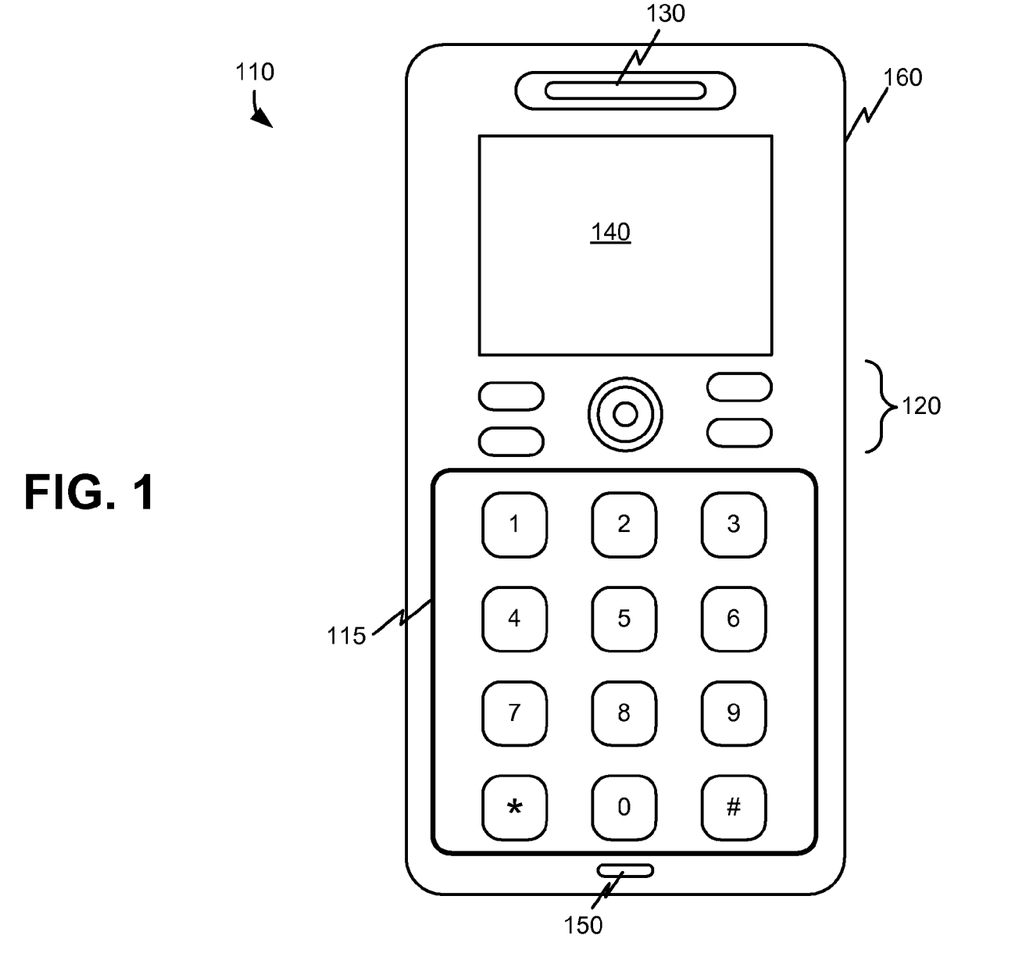
FIG. 1 is a diagram of an exemplary electronic device.

FIG. 1 is a diagram of an exemplary implementation of a device consistent with the invention. The device can be any type of portable electronic device. The device will particularly be described herein as a mobile terminal 110 that may include a radiotelephone or a personal communications system (PCS) terminal that may combine a cellular radiotelephone with data processing, a facsimile, and/or data communications capabilities.

Mobile terminal 110 may include housing 160, keypad 115, control keys 120, speaker 130, display 140, and microphone 150. Housing 160 may include a structure configured to hold devices and components used in mobile terminal 110. For example, housing 160 may be formed from plastic, metal, or composite and may be configured to support keypad 115, control keys 120, speaker 130, display 140 and microphone 150.

Keypad 115 may include devices and/or logic that can be used to operate mobile terminal 110. Keypad 115 may further be adapted to receive user inputs, directly or via other devices, such as via a stylus for entering information into mobile terminal 110. In one implementation, communication functions of mobile terminal 110 may be controlled by activating keys in keypad 115. The keys may have key information associated therewith, such as numbers, letters, symbols, etc. The user may operate keys in keypad 115 to place calls, enter digits, commands, and text messages, into mobile terminal 110. Designated functions of keys may form and/or manipulate images that may be displayed on display 140.

Control keys 120 may include buttons that permit a user to interact with communication device 110 to cause communication device 110 to perform specified actions, such as to interact with display 140, etc.

Speaker 130 may include a device that provides audible information to a user of mobile terminal 110. Speaker 130 may be located anywhere on mobile terminal 110 and may function, for example, as an earpiece when a user communicates using mobile terminal 110. Speaker 130 may also include a digital to analog converter to convert digital signals into analog signals. Speaker 130 may also function as an output device for a ringing signal indicating that an incoming call is being received by communication device 110.

Display 140 may include a device that provides visual images to a user. For example, display 140 may provide graphic information regarding incoming/outgoing calls, text messages, games, phonebooks, the current date/time, volume settings, etc., to a user of mobile terminal 110. Implementations of display 140 may be implemented as black and white or color flat panel displays.

Microphone 150 may include a device that converts speech or other acoustic signals into electrical signals for use by mobile terminal 110. Microphone 150 may also include an analog to digital converter to convert input analog signals into digital signals. Microphone 150 may be located anywhere on mobile terminal 110 and may be configured, for example, to convert spoken words or phrases into electrical signals for use by mobile terminal 110.

Figure 2:
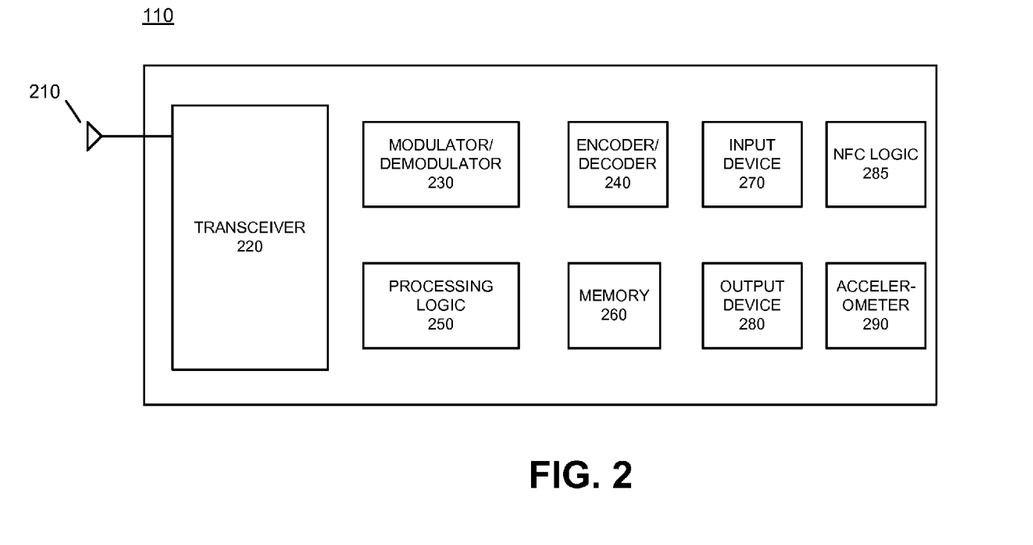
FIG. 2 is a diagram illustrating additional details of the mobile terminal shown in FIG. 1.

FIG. 2 is a diagram illustrating additional exemplary details of mobile terminal 110. Mobile terminal 110 may include a radio frequency (RF) antenna 210, transceiver 220, modulator/demodulator 230, encoder/decoder 240, processing logic 250, memory 260, input device 270, output device 280, near field communication (NFC) logic 285, and an accelerometer 290. These components may be connected via one or more buses (not shown). In addition, mobile terminal 110 may include one or more power supplies (not shown). One skilled in the art would recognize that the mobile terminal 110 may be configured in a number of other ways and may include other or different elements.

RF antenna 210 may include one or more antennas capable of transmitting and receiving RF signals. In one implementation, RF antenna 210 may include one or more directional and/or omni-directional antennas. Transceiver 220 may include components for transmitting and receiving information via RF antenna 210. In an alternative implementation, transceiver 220 may take the form of separate transmitter and receiver components, instead of being implemented as a single component.

Modulator/demodulator 230 may include components that combine data signals with carrier signals and extract data signals from carrier signals. Modulator/demodulator 230 may include components that convert analog signals to digital signals, and vice versa, for communicating with other devices in mobile terminal 110.

Encoder/decoder 240 may include circuitry for encoding a digital input to be transmitted and for decoding a received encoded input. Processing logic 250 may include a processor, microprocessor, an application specific integrated circuit (ASIC), field programmable gate array (FPGA) or the like.

Processing logic 250 may execute software programs or data structures to control operation of mobile terminal 110. Memory 260 may include a random access memory (RAM) or another type of dynamic storage device that stores information and instructions for execution by processing logic 250; a read only memory (ROM) or another type of static storage device that stores static information and instructions for use by processing logic 250; and/or some other type of magnetic or optical recording medium and its corresponding drive. Instructions used by processing logic 250 may also, or alternatively, be stored in another type of computer-readable medium accessible by processing logic 250. A computer-readable medium may include one or more memory devices.

Input device 270 may include any mechanism that permits an operator to input information to mobile terminal 110, such as microphone 150 or keypad 115. Output device 280 may include any mechanism that outputs information to the operator, including display 140 or speaker 130. Output device 280 may also include a vibrator mechanism that causes mobile terminal 110 to vibrate.

NFC logic 285 and accelerometer 290 may provide additional input mechanisms for input device 270. NFC logic 285 is generally used to sense user input to mobile terminal 110 based on the location of mobile terminal 110 relative to other devices. NFC logic 285 may implement the known near field communication (NFC) protocol. Accelerometer 290 may be generally used to sense user input to mobile terminal 110 based on movement of mobile terminal 110 by the user. In some implementations, both NFC logic 285 and accelerometer 290 may be implemented within mobile terminal 110. In other implementations, only one of NFC logic and accelerometer 290 may be implemented.

NFC logic 285 may include circuitry for communicating with other devices using the NFC protocol. The NFC protocol is a short-range wireless connectivity standard that uses magnetic field induction to enable communication between devices when they are touched together or brought within a few centimeters of each other (e.g., approximately three centimeters or less). NFC includes a passive communication mode in which, when two devices are communicating, one of the two may be a passive device that not require a power supply. Instead, the passive NFC device may receive a carrier field from another device and use the power from that carrier field to transmit information back to the other device. In alternate implementations, instead of using the NFC protocol to interact with other devices, mobile terminal 110 may use radio frequency identification (RFID) techniques to interact with or receive information from other devices that include RFID tags.

Accelerometer 290 may be an accelerometer that senses and outputs signals indicative of acceleration. Accelerometer 290 may be implemented to sense acceleration in one, two, or three directional axes. Accelerometers are generally known in the art and additional details relating to the operation of an accelerometer will not be described further herein.

Mobile terminal 110 may perform processing associated with, for example, operation of the core features of mobile terminal 110 or operation of additional applications associated with mobile terminal 110, such as software applications provided by third party software providers. Mobile terminal 110 may perform these operations in response to processing logic 250 executing sequences of instructions contained in a computer-readable medium, such as memory 260. It should be understood that a computer-readable medium may include one or more memory devices and/or carrier waves. Execution of sequences of instructions contained in memory 260 causes processing logic 250 to perform acts that will be described hereafter. In alternative embodiments, hard-wired circuitry may be used in place of or in combination with software instructions to implement processes consistent with the invention. Thus, implementations consistent with the invention are not limited to any specific combination of hardware circuitry and software.

Operation of Mobile Terminal with NFC Logic 285

Consistent with aspects of the invention, mobile terminal 110 can receive commands based on gestural interaction with a user in which the user moves the mobile terminal near predetermined trigger devices associated with the user. The trigger devices may be passive NFC devices "disguised" in jewelry, clothing, or user accessories.

Figure 3:
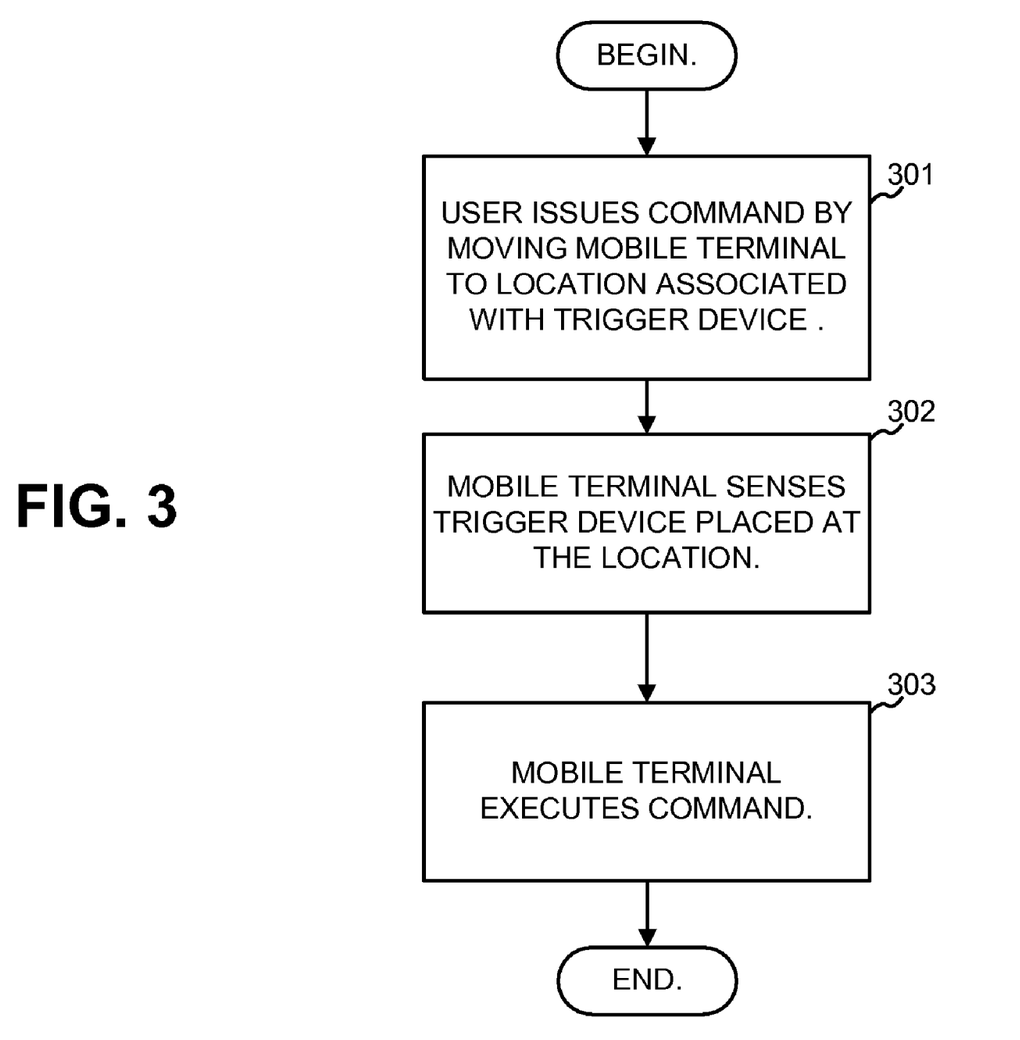
FIG. 3 is a flow chart illustrating exemplary operations of a mobile terminal in receiving commands based on gestural interaction with the user.

FIG. 3 is a flow chart illustrating exemplary operations of mobile terminal 110 in receiving commands based on gestural interaction with a user.

A user may issue a command to mobile terminal 110 by moving mobile terminal 110 to a location associated with a trigger device (act 301). The particular location may be a location at which one of a number of corresponding electronic trigger devices are placed that are designed to communicate with NFC logic 285 using the NFC protocol. The trigger devices may be placed within or on, for example, jewelry, clothing, a wrist watch, a belt, or even on the user's body. The trigger devices may be passive electronic devices that do not contain any internal power supply. Instead of an internal power supply, the trigger devices may use magnetic field induction using energy received from NFC logic 285 to transmit a response back to NFC logic 285. The response may include, for example, identification information through which mobile terminal 110 may identify the trigger device.

Figure 4:
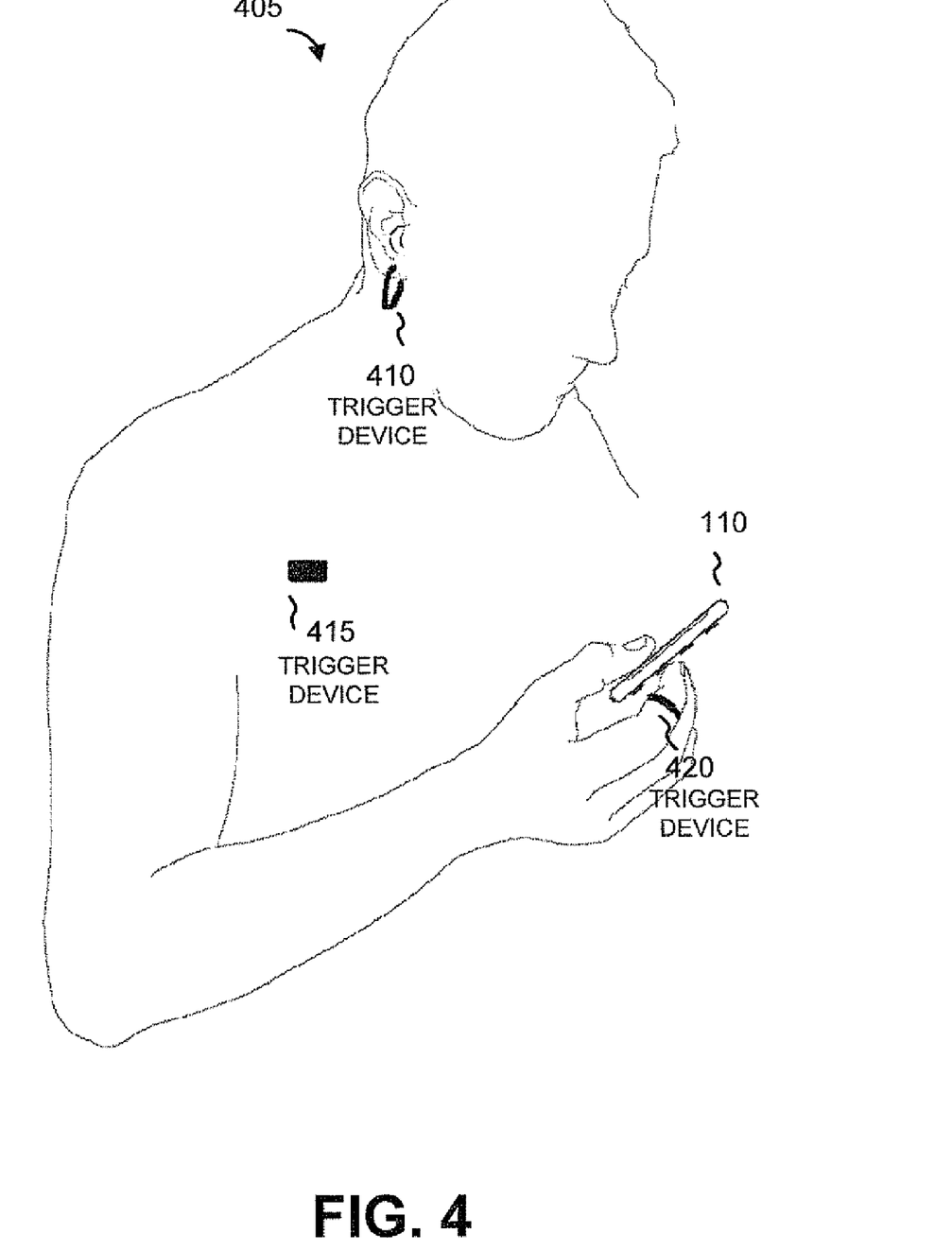
FIG. 4 is a diagram illustrating an exemplary deployment of trigger devices used in the gestural interaction shown in FIG. 3.

FIG. 4 is a diagram illustrating an exemplary deployment of trigger devices. The electronic circuitry that enables the trigger devices may be relatively small, allowing the trigger devices to be effectively hidden in jewelry or clothing. As shown in FIG. 4, a user 405 may interact with a mobile terminal 110 with the assistance of a number of trigger devices 410, 415, and 420. In this example, trigger device 410 may be a decorative earring that includes circuitry for implementing NFC with NFC logic 285 of mobile terminal 110, trigger device 415 may be a patch attached to the user's skin or embedded in a shirt that includes circuitry for implementing NFC with NFC logic 285, and trigger device 420 may be a ring that includes circuitry for implementing NFC with NFC logic 285. In some implementations, a single item, such as a shirt, may include a number of different trigger devices.

The NFC protocol implemented between NFC logic 285 and triggers 410, 415, and 420 may be implemented with a very short range (e.g., a few centimeters or less). When the user moves mobile terminal 110 into range of an appropriate trigger device, NFC logic 285 may sense and identify the trigger device (act 302). In one implementation, the sensing range of NFC logic 285 and the corresponding trigger devices may be designed to be a close proximity to one another, such as on the order of a few centimeters or less (e.g., three centimeters down to physical contact). Each trigger device may be associated with a command in mobile terminal 110. Mobile terminal 110 may also allow the user to customize the command associated with any particular trigger device. When the trigger device is sensed, mobile terminal 110 may execute the command (act 303). For example, the user may desire that placing mobile terminal 110 near his right ear causes mobile terminal 110 to answer the phone. Accordingly, the user may associate earring trigger device 410 with answering mobile terminal 110. Alternatively, placing the mobile terminal near his left ear may indicate that the user is busy and may send the call directly to voicemail. Trigger devices 415 and 420 may alternatively be associated with other commands. For example, placing mobile terminal 110 near trigger device 415 may cause mobile terminal 110 to call a specific number, such as the number of a family member.

In one implementation, ring trigger device 420 may be associated with a security command that disables or hides functionality of mobile terminal 110 when the mobile terminal is not in range of ring trigger device 420. For example, mobile terminal 110 may not allow a call to be placed or may not allow certain features to be used when the mobile terminal is not in range of ring trigger device 420. In this manner, if the mobile terminal is lost or stolen, the user can be assured that the mobile terminal 110 will not be used to place unauthorized calls and/or that the user's personal data is safe from unauthorized access. On the other hand, during normal use of mobile terminal 110 by the authorized user, ring trigger device 420 will naturally be within range of mobile terminal 110, and will thus fully enable mobile terminal 110 without requiring additional effort on the part of the user.

One of ordinary skill in the art will recognize that protocols other than the NFC protocol may be used to identify proximity to triggers to mobile terminal 110. For example, NFC logic may be replaced with RFID logic, and triggers 410, 415, and 420 may include RFID tags. Other wireless protocols may also be used.

In some implementations, the possible set of gestural or movement related interactions that are recognized by mobile terminal 110 may be customizable by the user. In other words, the user may be able to associate any compatible trigger device with a user chosen mobile terminal command. Such functionality may be obtained by a menu provided by display 140. For example, display 140 and input device 270 may allow the user to enter information regarding particular commands. The display may then allow the user to identify particular trigger devices that will correspond to the particular command.

Operation of Mobile Terminal with Accelerometer 290

Figure 5:
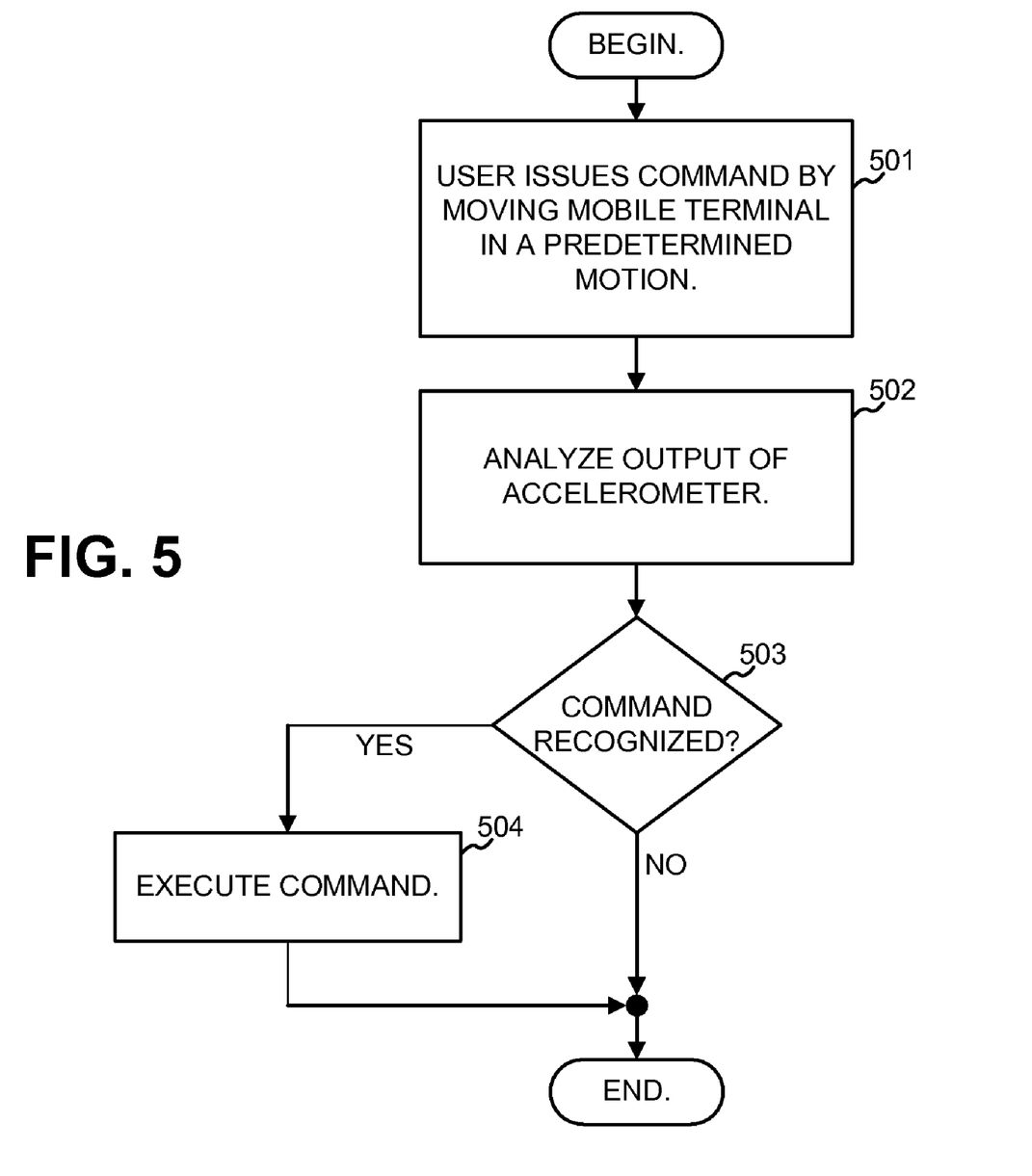
FIG. 5 is a flow chart illustrating exemplary operations of the mobile terminal in receiving commands based on body actions that cause the mobile terminal to be moved in a predetermined motion.

FIG. 5 is a flow chart illustrating exemplary operations of mobile terminal 110 in receiving commands based on body actions in which mobile terminal 110 is moved in a predetermined motion.

Figure 6:
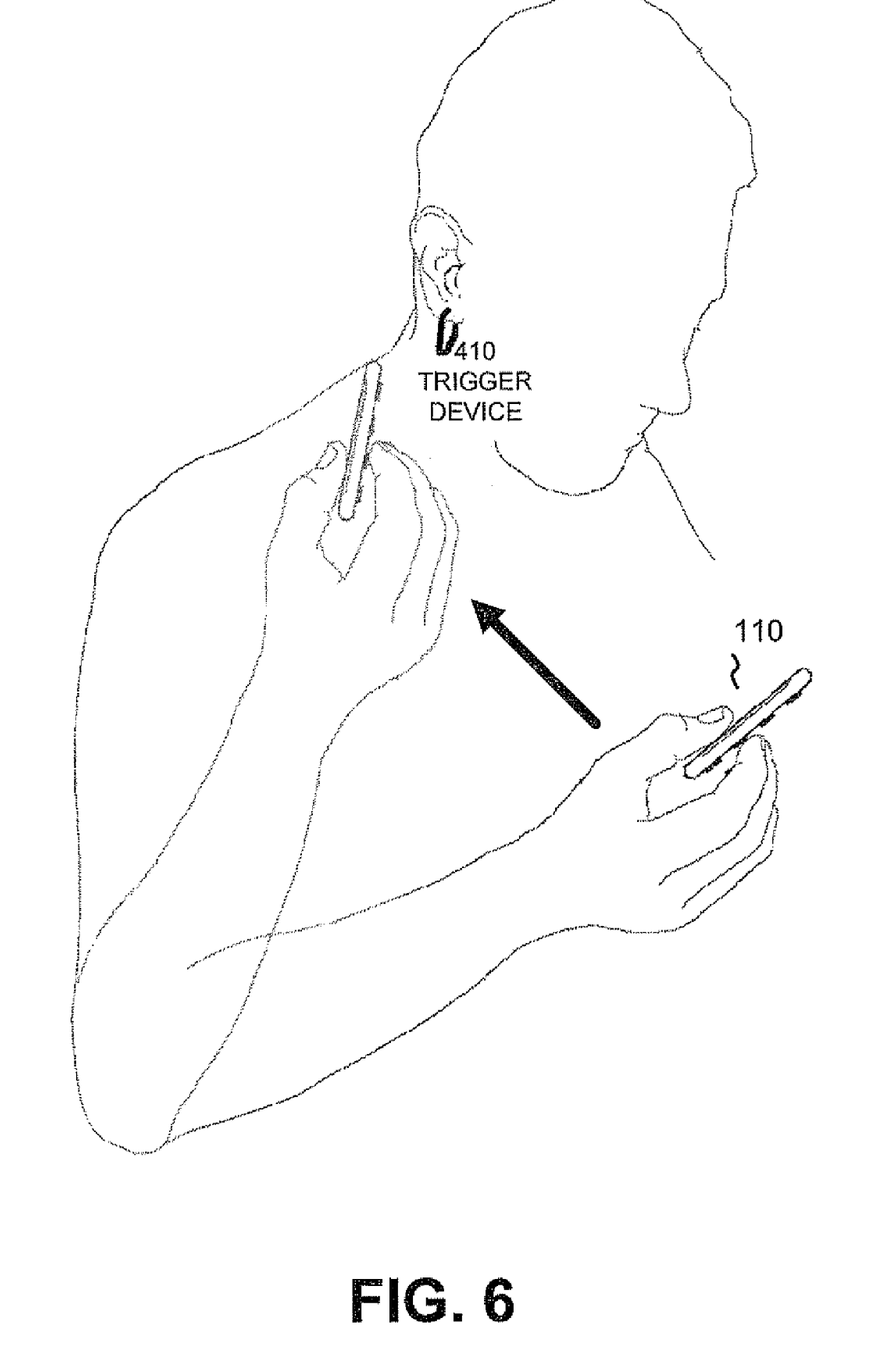
FIG. 6 is a diagram illustrating exemplary body actions causing the motion of the mobile terminal.

A user may issue a command to mobile terminal 110 by moving mobile terminal in a predetermined motion (act 501). For example, the user may hold mobile terminal 110 in front of the chest area (or some other beginning location) and move mobile terminal 110 in an upward motion to a location near the shoulder area. FIG. 6 is a diagram illustrating such a motion with mobile terminal 110.

Accelerometer 290 will generate one or more output signals based on the user's movement. These output signals may be analyzed to attempt to determine matches to movements that have been pre-programmed into mobile terminal 110 (act 502). Techniques for analyzing acceleration signals from an accelerometer and matching the signals to predetermined "goal" signals are known in the art and will therefore not be described further herein.

Mobile terminal 110 may determine whether the movement analyzed in act 502 corresponds to a command that the user would like to execute (act 503). If so, mobile terminal 110 may perform action dictated by the command (act 504). For example, moving mobile terminal 110 in the motion shown in FIG. 6 may cause the mobile terminal to open a contact list, dial a predetermined number, or begin playing music.

In some implementations, the possible set of motions that are recognized by mobile terminal 110 may be customizable by the user. In other words, the user may have a particular arbitrary motion that he would like to associate with a particular command. For example, the user may wish to associate quickly moving mobile terminal to the heart area of the chest with a command that initiates a telephone call with a particular loved one. The user may begin by "demonstrating" (performing) the motion one or more times. Mobile terminal 110 may then learn that the motion corresponds to the particular command. The user may then direct mobile terminal 110 to associate the newly trained motion with a particular command (i.e., calling a certain phone number).

Operation of Mobile Terminal with NFC Logic 285 and Accelerometer 290

In some implementations, a user may issue commands using both gestural/movement interaction with NFC logic 285 and body motions with accelerometer 290. For example, a first user motion that involves moving mobile terminal 110 from the chest area down to the belt area of the user may invoke a first command while a second user motion that involves moving mobile terminal 110 from the chest area down to the belt area and that moves in range of a particular trigger device placed on a belt, may invoke a second command. In this manner, the first and second motions by the user, which may be very similar or identical based on the output of accelerometer 290, may be interpreted differently by mobile terminal 110 depending on whether the motion activates a trigger device.

Figure 7:
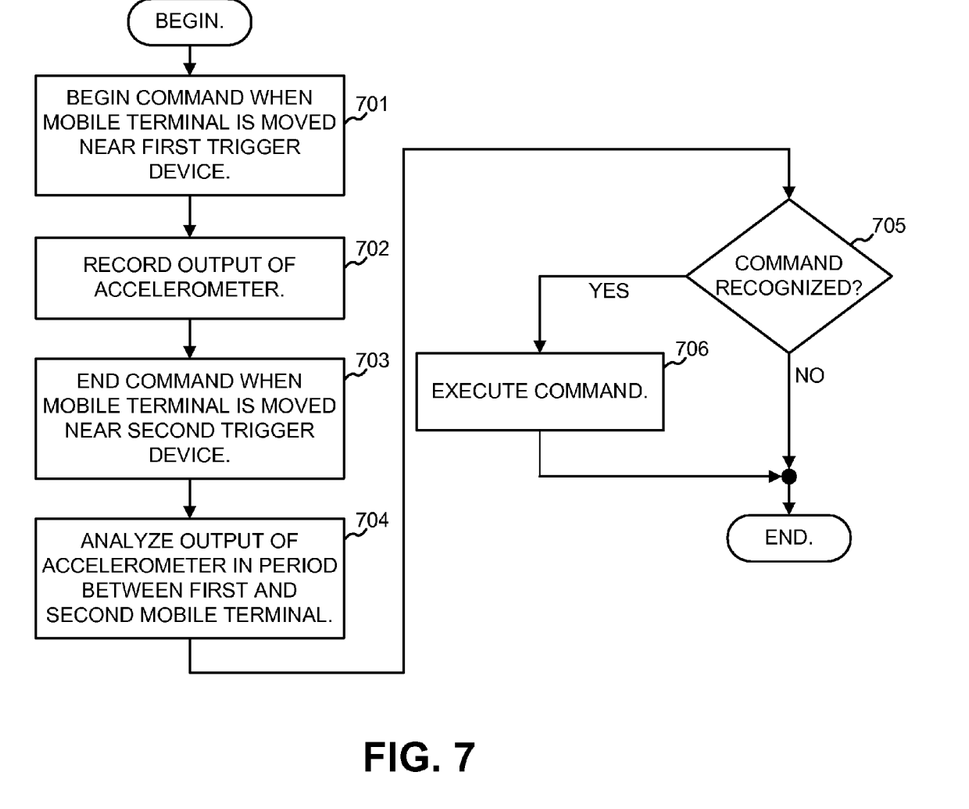
FIG. 7 is a flow chart illustrating exemplary operations that may be performed when issuing commands using both gestural/movement interaction and body motions.

FIG. 7 is a flow chart illustrating exemplary operations that may be performed when issuing commands using both gestural/movement interaction with NFC logic 285 and body motions with accelerometer 290. A user may initiate issuance of a command to mobile terminal 110 by moving mobile terminal 110 to a location associated with a trigger device (act 701). The particular location may be a location at which one of a number of corresponding electronic trigger devices are placed that are designed to communicate with NFC logic 285 using the NFC protocol. As an example, referring back to FIG. 4, the user may move mobile terminal near the decorative earring trigger device 410. In response to the detection of act 701, mobile terminal 110 may record the output of accelerometer 290 (act 702) until the user moves mobile terminal 110 to the vicinity of a second trigger device (act 703). For example, the second trigger device may be trigger device 415 (FIG. 4). The output of accelerometer 290 between the first and second trigger devices may define a command for mobile terminal 110. For example, moving mobile terminal in a straight line between trigger device 410 and 415 may indicate a first command while making a circular loop between trigger device 410 and 415 may indicate a second command.

Mobile terminal 110 may determine whether the movement recorded in act 702 corresponds to a known command (act 705). If so, mobile terminal 110 may perform the action dictated by the command (act 706). For example, moving mobile terminal 110 in a circular loop motion between trigger devices 410 and 415 may cause the mobile terminal to open a contact list, dial a predetermined number, or begin playing music.

Figure 8:
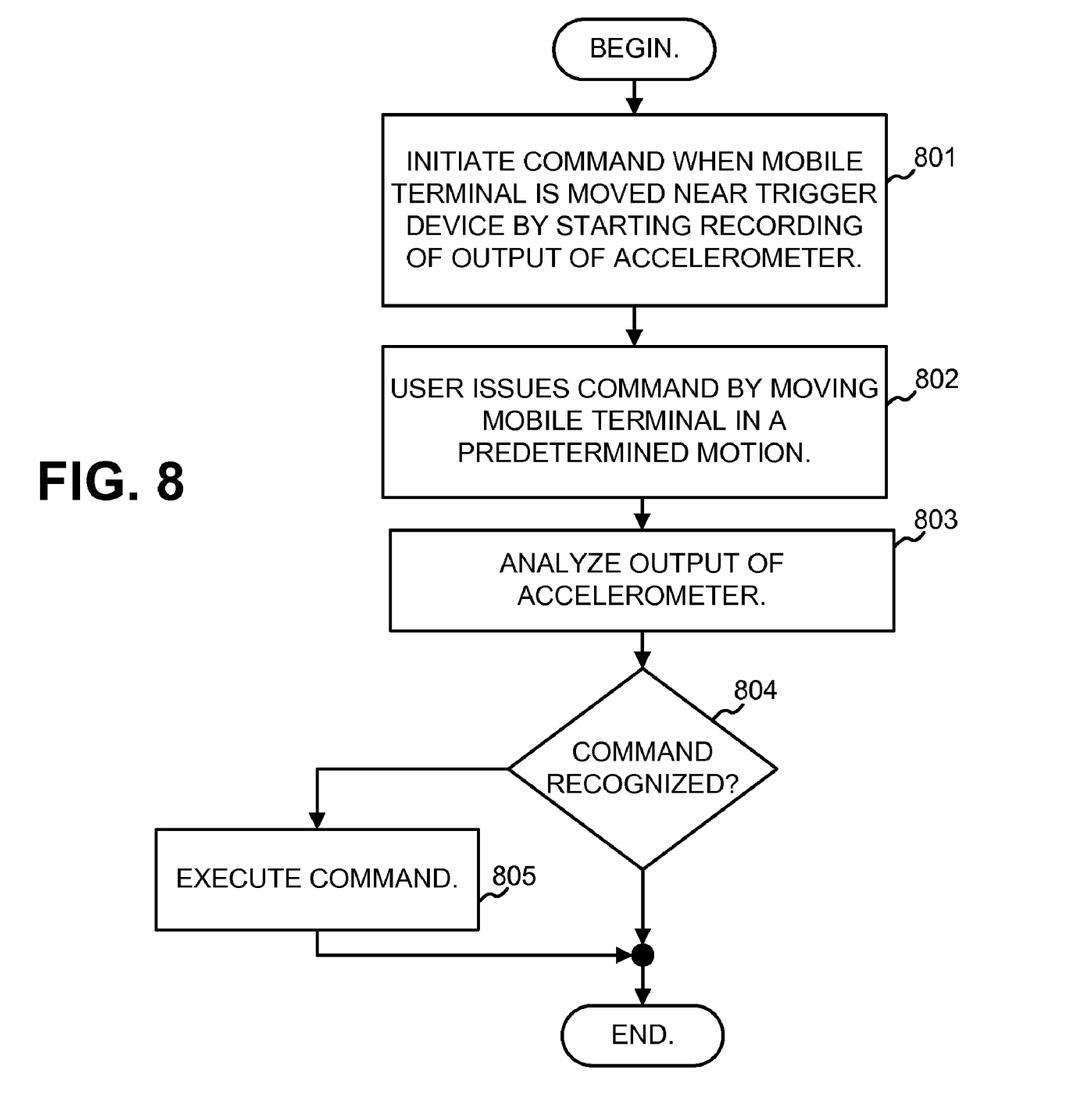
FIG. 8 is a flow chart illustrating exemplary operations that may be performed in a second embodiment when issuing commands using both gestural/movement interaction and body motions.

FIG. 8 is a flow chart illustrating exemplary operations that may be performed in a second embodiment when issuing commands using both gestural/movement interaction with NFC logic 285 and body motions with accelerometer 290. The method shown in FIG. 8 is similar to that shown in FIG. 7, except that instead of using a second trigger device to end the command, mobile terminal 110 continues to analyze the output of the accelerometer until a command is detected or until a predetermined time has elapsed.

More specifically, as shown in FIG. 8, a user may initiate issuance of a command to mobile terminal 110 by moving mobile terminal 110 to a location associated with a trigger device (act 801). When the mobile terminal senses the presence of the trigger device, the mobile terminal may begin recording the output of accelerometer 290 (act 801). A user may then issue a command to mobile terminal 110 by moving mobile terminal in a predetermined motion (act 802).

The output of accelerometer 290 may be analyzed to attempt to determine matches to movements that have been pre-programmed into mobile terminal 110 (act 803). Mobile terminal 110 may determine whether the movement analyzed in act 502 corresponds to a command that the user would like to execute (act 804). If so, mobile terminal 110 may perform action dictated by the command (act 805). In some implementations, mobile terminal 110 may only continue to record and analyze the output of the accelerometer for a predetermined period of time after the user has initiated issuance of the command by moving the mobile terminal to the location associated with the trigger device. If this predetermined period elapses without detection of a command, mobile terminal 110 may stop recording and/or analyzing the output of accelerometer 290.

CONCLUSION

As described above, gestural/movement interactions with a trigger device and/or body motions, such as motions detected with an accelerometer, may be used to augment user interaction with a mobile terminal.

The foregoing description of the embodiments of the invention provides illustration and description, but is not intended to be exhaustive or to limit the invention to the precise form disclosed. Modifications and variations re possible in light of the above teachings or may be acquired from practice of the invention.

Further, while series of acts have been described with respect to FIGS. 3 and 5, the order of the acts may be varied in other implementations consistent with the invention. Moreover, non-dependent acts may be performed in parallel.

It will also be apparent to one of ordinary skill in the art that aspects of the invention, as described above, may be implemented in cellular communication devices/systems, methods, and/or computer program products. Accordingly, the present invention may be embodied in hardware and software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an application specific integrated circuit or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A mobile terminal comprising:
an accelerometer; and
a processor to:
sense a first trigger device when the mobile terminal enters a first predetermined proximity of the first trigger device;
begin recording an output of the accelerometer when the first trigger device is sensed;
sense a second trigger device when the mobile terminal enters a second predetermined proximity of the second trigger device;
stop the recording of the output of the accelerometer when the second trigger device is sensed;
analyze the recorded output of the accelerometer to determine a match with a predefined movement of a set of predefined movements corresponding to a plurality of commands; and
execute one of the plurality of commands associated with the one predefined movement that is matched, the one of the plurality of commands relating to operation of the mobile terminal.

2. The mobile terminal of claim 1, where the first predetermined proximity comprises a distance of approximately three centimeters or less to the mobile terminal.

3. The mobile terminal of claim 1, where the processor senses the first trigger device using a passive mode of operation in which the first trigger device receives power from the mobile terminal.

4. The mobile terminal of claim 1, where the command comprises a command to dial a predetermined number.

5. The mobile terminal of claim 1, where the processor identifies the first trigger device from among a plurality of different trigger devices.

6. The mobile terminal of claim 1, where the first trigger device is embedded in jewelry or clothing.

7. The mobile terminal of claim 1, where the command comprises a security related command that disables or hides functionality of the mobile terminal when the mobile terminal is not within the predetermined proximity of the first trigger device.

8. The mobile terminal of claim 1, where the processor uses near field communication (NFC) protocol.

9. The mobile terminal of claim 1, where the processor uses radio frequency identification (RFID) techniques.

10. The mobile terminal of claim 1, where the first trigger device differs from the second trigger device.

11. The mobile terminal of claim 10, where a location of the first trigger device differs from a location of the second trigger device.

12. A method implemented in a mobile terminal comprising:
sensing a presence of a first trigger device when the mobile terminal comes within a predetermined proximity of the first trigger device;
recording an output of an accelerometer of the mobile terminal, beginning when the presence of the first trigger device is sensed;
ceasing recording the output of the accelerometer when a presence of a second trigger device is sensed;
analyzing the recorded output of the accelerometer to determine if the output is indicative of a particular predefined motion of a set of predefined motions respectively corresponding to a plurality of commands associated with operation of the mobile terminal; and
performing an action, at the mobile terminal, pursuant to a corresponding one of the plurality of commands when the output is indicative of the particular predefined motion.

13. The method of claim 12, where the first trigger device is embedded in jewelry or clothing.

14. The method of claim 13, where the predetermined proximity of the mobile terminal is a distance of approximately three centimeters or less to the mobile terminal.

15. The method of claim 12, where the first trigger device does not include an internal power supply.

16. The method of claim 12, where the one of the plurality of commands comprises a command to dial a predetermined number or answer a ringing of the mobile terminal.

17. The method of claim 12, where sensing the first trigger device includes identifying the first trigger device from among a plurality of possible different trigger devices.

18. The method of claim 12, where sensing the first trigger device is based on near field communication (NFC) protocol.

19. The method of claim 12, where sensing the first trigger device is based on radio frequency identification (RFID) techniques.

* * * * *